J. E. MONIGHAN.
FISHING SIGNAL.
APPLICATION FILED FEB. 21, 1917.
1,309,365.
Patented July 8, 1919.
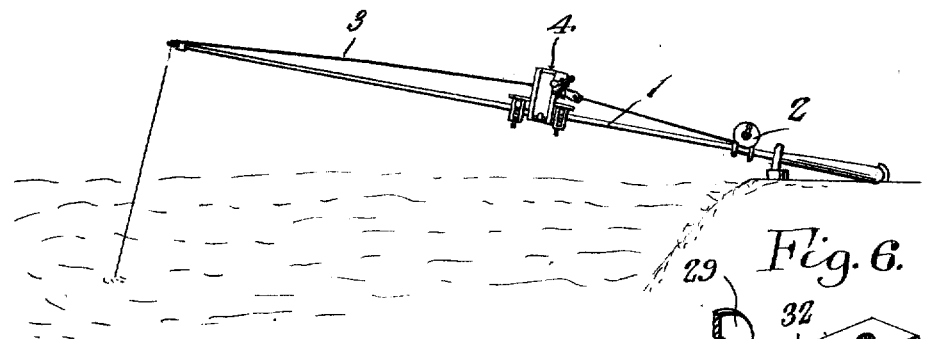
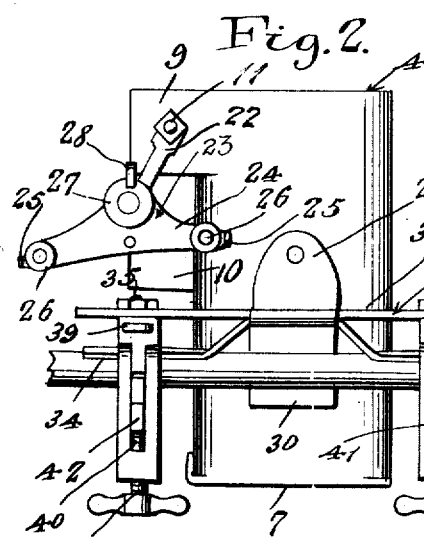
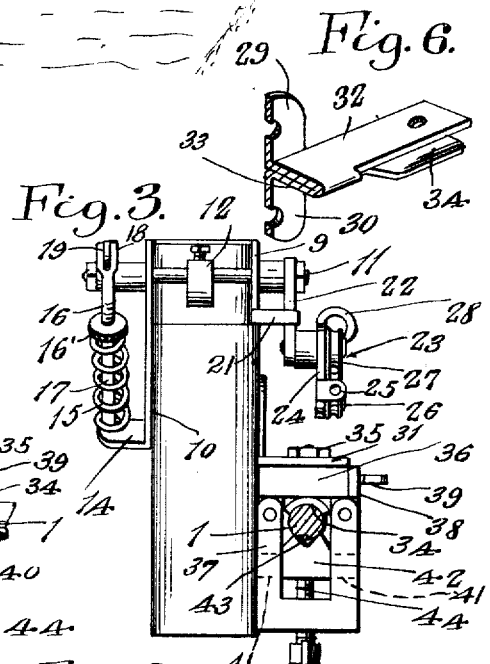
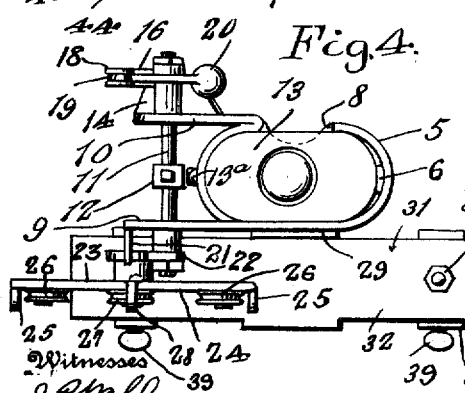
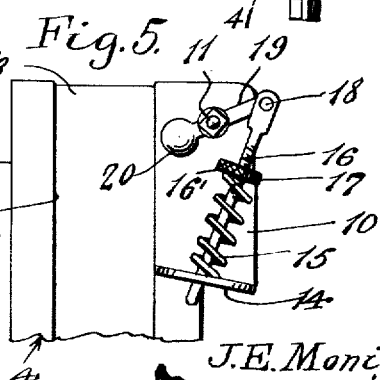
Inventor
J. E. Monighan.

UNITED STATES PATENT OFFICE.

JOHN EMEY MONIGHAN, OF FORT WAYNE, INDIANA.

FISHING-SIGNAL.

1,309,365.  Specification of Letters Patent.  Patented July 8, 1919.

Application filed February 21, 1917. Serial No. 150,291.

*To all whom it may concern:*

Be it known that I, JOHN E. MONIGHAN, a citizen of the United States, residing at Fort Wayne, in the county of Allen and State of Indiana, have invented certain new and useful Improvements in Fishing-Signals; and I do hereby declare the following to be a full, clear, and exact description of the invention, such as will enable others skilled in the art to which it appertains to make and use the same.

This invention relates to new and useful improvements in fishing signals, and the principal object of the invention resides in the provision of a signal for indicating to the fisherman when a fish is caught.

Another object of the invention resides in the provision of a device for attachment to a fishing rod which supports a flash light in such a position as to be readily seen by the user and which light is automatically flashed when pull is exerted on the hook.

A still further object of the invention is to provide a device which is adapted for use in connection with a line using a reel and which is so arranged that the line may be run out or wound on the reel without being interfered with in any way by the device and yet providing means for operating the light when a fish bites.

With these and other objects in view, the invention consists in the novel combination and arrangement of parts which will be fully set forth in the following specification and accompanying drawings, in which:—

Figure 1 shows a fishing rod in use with this device applied thereto;

Fig. 2 is a side view in elevation of the signal showing the same in place on a portion of the fishing rod;

Fig. 3 is an end view of Fig. 2;

Fig. 4 is a top plan view of the device;

Fig. 5 is a fragmentary side elevation of the device from the side opposite Fig. 2; and Fig. 6 is a detail perspective view of a portion of the attaching plate by means of which the device is secured to the fishing rod.

Referring to the drawings, 1 designates a fishing rod of the ordinary construction provided with the usual reel 2 on which the fishing line 3 is wound. The attachment is designated generically by the numeral 4 and is best illustrated in Figs. 2 to 6 inclusive.

The attachment 4 above referred to comprises a casing 5 which is shaped to conform with the shape of a vest pocket flash light of common construction provided with the usual sliding contact member or button. This casing 5 is provided with a retaining spring 6 by means of which the flash light is held in place and one end of the casing is open while the opposite end is provided with a closure 7. The casing is formed with a longitudinal slot 8 so that the flash light may be easily placed in position or removed from the device. Formed integrally with the casing and extending from one edge thereof is an ear 9 while the opposite edge has formed integrally therewith a flange 10. This ear and flange are each formed with openings in which a shaft 11 is rotatably mounted and this shaft carries a cam 12 for engaging against the push button 13ª of the flash light designated by the numeral 13. Formed at the lower end of the flange 10 is an outturned ear 14 against which a compression coiled spring 15 abuts. The upper end of this coiled spring bears against a nut 16' which is adjustable on the threaded portion 16 of a plunger rod 17 one end of which is bifurcated as at 18 while the opposite end is slidable through an opening formed in the ear 14. The bifurcated end 18 of the plunger is connected to a lever 19 which is mounted on the projecting end of the shaft 11, and a counter-weight 20 is formed on the end of the lever, as clearly illustrated in Fig. 5.

It will be understood that the angular relation of the cam 12 with the lever 19 is such that when the lever is in the position illustrated in Fig. 5, the cam will be out of engagement with the control button of the flash light.

In order to provide a means for moving the cam into engagement with the flash light control button, the ear 9 is formed with a stop finger 21 which engages and limits the movement of a lever 22 carried on the end of the shaft 11 opposite to which the lever 19 is connected. The lever 22 is adapted to engage the finger 21 in order to limit the movement of the shaft 11 and thereby hold the cam 12 in proper position for engagement against the control button of the flash light. Rotatably connected to the end of the lever 22 opposite that connected to the shaft 11, is a suitable rocking element designated generically by the numeral 23, which rocking element comprises a plate 24 having formed at its edge apertured ears 25. Grooved pulleys 26 are rotatably secured to the outer face of the plate 24 adjacent the ears 25 and formed centrally of the plate is an off-set portion to which a grooved pulley 27 is attached. A retaining guide hook 28 is formed integrally with the plate and bends over the pulley 27 as illustrated in Fig. 3.

Riveted or otherwise rigidly attached to the casing 5 are the ears 29 and 30 which are formed integrally with the attaching plate designated by the numeral 31. The attaching plate 31 comprises a plate 32 which is bent back upon itself as at 33 and forms the oppositely extending off-set arms 34 which are transversely curved to receive the fishing rod. The ear 30 is formed at the edge of the bent back portion 33 as clearly illustrated in Fig. 6. The opposite ends of the plate 32 are apertured to receive bolts 35 by means of which suitable inverted L-shaped attaching brackets are secured to said plate. These brackets are designated by the numeral 36 and the horizontal arms of said brackets are disposed between the plate 32 and the arms 34 as clearly illustrated in Fig. 3. Pivoted to the downwardly extending arm of the L-shaped attaching brackets 36 are the U-shaped clamp frames 37 carrying at the ends of the arms opposite those attached to the downwardly extending arms of the brackets 36 suitable hinged plates having extending therethrough thumb screws 39 the ends of which are threaded into the ends of the horizontal arms of the brackets 36, thus providing a yoke in which the fishing rod 1 is received. Vertical slots 40 are formed in the arms of the U-shaped frames or yokes 37 and form guides for ears 41 formed on the clamp members 42 the upper ends of which are provided with V-shaped notches 43 to engage the under side of the fishing rod. Screws 44 are threaded through the bight portions of the U-shaped frames 37 and engage the under side of the clamp members 42 to force the same upwardly and against the fishing rod, thereby firmly securing the device in place on the fishing rod.

It will be apparent from the foregoing, that in use the device is first placed in position on a fishing rod by arranging the thumb screws 39 and allowing the yokes to open whereupon the rod is placed in position by resting the curved bearing arms 34 of the attaching plate 31 on the rod whereupon the yokes are closed and the thumb screws 39 tightened into place. After the rod has been placed in position the thumb screws 44 are turned to cause the clamping members 42 to move into engagement with the under side of the rod and firmly clamp the device on the rod thereby placing the device in position for operation. The fishing line 3 is then taken from the reel and passed through the opening in the ear 25 nearest the reel, after which it is passed beneath the roller 26 adjacent the ear 25 and the line is then passed beneath the hook 28 and over the roller 27 after which it passes beneath the roller 26 farthest from the reel and through the opening in the ear 25, farthest from the reel, after which the same is threaded through the eye of the rod in the usual way. A pocket flash light is then placed in the casing 5 and it will be apparent that when a fish bites, pull will be exerted on the line thereby causing the plate 24 to exert pull on the lever 22 to cause the shaft 11 to turn and move the cam 12 into engagement with the push button control of the flash light thereby causing said push button to complete the circuit through the light.

While in the foregoing there has been shown and described the preferred embodiment of this invention, it is to be understood that such changes may be made in the combination and arrangement of parts as will fall within the spirit and scope of the appended claims.

What is claimed is:—

1. In a device of the character described, the combination with a casing adapted to be secured upon a fishing rod, of an electric flash light of common construction provided with a slidable contact member projecting beyond the casing, said light being mounted in the casing, and means actuatable by a fishing line when pull is exerted thereon for moving the contact member of said light into operative position so as to close the circuit thereof and cause illumination of the light.

2. In a device of the class described, the combination with a casing adapted to be secured upon a fishing rod, of an electric flash light of common construction mounted in said casing and provided with a slidable contact member, a shaft rockably supported by said casing and provided with a cam for engagement with the contact member of the light so as to move the same into operative position to cause illumination of said light when the shaft is rocked in one direction, and means actuatable by a fishing line when pull is exerted thereon for rocking said shaft in operative direction.

3. In a device of the class described, the combination with a casing adapted to be secured upon a fishing rod, of an electric flash light of common construction mounted in said casing and provided with a slidable contact member, and means carried by said casing and actuatable by a fishing line inserted therethrough when pull is exerted on said line for engaging the contact member of the light and moving it into operative position so as to cause closing of the circuit thereof and illumination of said light.

4. In a device of the class described, the combination with a fishing rod, a reel and line, of a casing, said casing being adapted to be secured at any point on said fishing rod, a flash light fitted in said casing, bearings extending outwardly from one end of the casing, a rock shaft mounted in said bearing, a cam on the rock shaft adapted to engage the control button of the flash light, a lever on said rock shaft, means to connect the rock shaft with a fishing line between the reel and terminal of the rod whereby a pull on said line will cause said shaft to rock and flash the light, a second lever connected to the rock shaft, a plunger connected to said second lever, and a spring engaging beneath the plunger and adapted to exert pressure thereon when the shaft is moved whereby the shaft will be returned to normal inoperative position.

5. In a device of the class described, the combination with a fishing rod, a reel and a line, of a casing, a flash light fitted in said casing, bearings extending outwardly from one end of the casing, a rock shaft mounted on said bearing, a cam on the rock shaft adapted to engage the control button of the flash light, a lever on said rock shaft, means to connect the rock shaft with the fishing line intermediate the reel and terminal of the rod, whereby a pull on said line will cause said shaft to rock and flash the light, a lever connected to the rock shaft, a plunger connected to the lever, a spring engaging beneath the plunger and adapted to exert pressure thereon when the shaft is moved whereby the shaft will be returned to normal inoperative position, and an attaching plate secured to the casing by which the same can be attached at any point to a fishing rod.

6. In a device of the class described, the combination with a fishing rod, a reel and a line, of a casing, a flash light fitted in said casing and having a slidable contact member, bearings extending outwardly from one end of the casing, a rock shaft, mounted on said bearing, a cam in the rock shaft adapted to engage the contact member of the flash light, a lever on said rock shaft, means to connect the rock shaft with the fishing line intermediate the reel and terminal of the rod whereby a pull on said line will cause said shaft to rock so as to actuate the contact member of said light by means of said cam, a lever connected to the rock shaft, a plunger connected to the lever, and a spring engaging beneath the plunger and adapted to exert pressure thereon when the shaft is moved whereby the shaft will be returned to normal inoperative position.

In testimony whereof I affix my signature in presence of two witnesses.

JOHN EMEY MONIGHAN.

Witnesses:
HOWARD HAWTHORN,
FRANK CRAMER.

Copies of this patent may be obtained for five cents each, by addressing the "Commissioner of Patents, Washington, D. C."